(12) United States Patent
Pentecost (10) Patent No.: US 6,511,541 B2
(45) Date of Patent: Jan. 28, 2003

(54) POWDER APPLICATOR FOR PARTICULATE MATERIAL COATING

(75) Inventor: Barry W. Pentecost, Ankeny, IA (US)

(73) Assignee: Spray Dynamics, Ltd., St. Clair, MO (US)

( * ) Notice: Subject to any disclaimer, the term of this patent is extended or adjusted under 35 U.S.C. 154(b) by 125 days.

(21) Appl. No.: 09/794,605

(22) Filed: Feb. 27, 2001

(65) Prior Publication Data

US 2002/0117108 A1 Aug. 29, 2002

(51) Int. Cl.⁷ .............................. A23G 3/26; B05D 7/00
(52) U.S. Cl. .................... 118/303; 118/13; 118/308; 118/418; 427/212
(58) Field of Search ................... 118/303, 308, 118/58, 64, 13, 16, 19, 20, 24, 25, 309, 313, 418; 427/212; 239/159, 170

(56) References Cited

U.S. PATENT DOCUMENTS

| | | | |
|---|---|---|---|
| 39,722 A | 9/1863 | Dole et al. | |
| 1,391,604 A | 9/1921 | Baumgard | |
| 2,986,475 A | * 5/1961 | Mesnard et al. | 118/20 |
| 3,729,834 A | 5/1973 | Fox | |
| 3,826,540 A | * 7/1974 | Jensen | 222/195 |
| 3,877,415 A | 4/1975 | Blouin | |
| 3,883,959 A | 5/1975 | Neville | |
| 3,894,508 A | 7/1975 | Burgess | |
| 3,902,669 A | * 9/1975 | Keibler | 118/303 |
| 3,934,545 A | 1/1976 | Schady | |
| 4,027,624 A | 6/1977 | Motoyama | |
| 4,272,234 A | 6/1981 | Tse | |
| 4,308,669 A | 1/1982 | Noyes et al. | |
| 4,507,335 A | 3/1985 | Mathur | |
| 4,543,906 A | 10/1985 | Glatt et al. | |
| 4,586,457 A | 5/1986 | Dunajtschik | |
| 4,639,383 A | 1/1987 | Casey | |
| 4,640,218 A | 2/1987 | Motoyama et al. | |
| 4,686,115 A | 8/1987 | Majer | |
| 4,862,826 A | 9/1989 | Christen | |
| 5,395,449 A | 3/1995 | Quadir et al. | |
| 5,401,534 A | * 3/1995 | Bourreau et al. | 118/303 |
| 5,435,945 A | 7/1995 | De Paoli et al. | |
| 5,443,637 A | 8/1995 | Long, Jr. et al. | |
| 5,470,603 A | 11/1995 | Staniforth et al. | |
| 5,494,709 A | 2/1996 | Long, Jr. et al. | |
| 5,501,874 A | 3/1996 | Yamamoto et al. | |
| 5,601,051 A | * 2/1997 | Bajek | 118/308 |
| 6,142,095 A | * 11/2000 | Long | 118/13 |

OTHER PUBLICATIONS

Vaccon Co. Inc. web page –product line information of high Flow Vacuum pumps for material transfer, undated, pp. 1–5 and 16–17.*

* cited by examiner

Primary Examiner—Richard Crispino
Assistant Examiner—Yewebdar T Tadesse
(74) Attorney, Agent, or Firm—McKee, Voorhees & Sease, P.L.C.

(57) ABSTRACT

A machine for coating particulate material includes a rotatable drum with a solid or perforated sidewall. A boom extends into the drum to support one or more spray nozzles and one or more powder applicators. Particulate material is introduced into the drum and subjected to a solution coating from the nozzles and a powder coating from the powder applicators, while the drum rotates. Air may flow through the perforated drum to facilitate drying of the coating solution and powder. The powder applicators are individually regulated so as to provide even distribution of the powder throughout the length of the drum.

15 Claims, 6 Drawing Sheets

POWDER APPLICATOR FOR PARTICULATE MATERIAL COATING

FIELD OF THE INVENTION

This invention relates to a method and means for coating particulate material in a rotating drum, including the application of a coating solution and powder to hasten the build up and drying of coating layers on the particulate material.

BACKGROUND OF THE INVENTION

It has been known for many years to coat particulate materials, such as seeds, pharmaceutical products, snack foods, and breakfast cereals. In the seed industry, generally a coating which increases the weight of the seed up to 25% is referred to as pelletizing. Pelletizing provides uniformity of size to the particles. Depending on the extent of coating applied, pelletizing may provide a spherical shape to the particles which are normally elongated or irregularly shaped.

There are three primary reasons for providing a coating to seeds. First, a protective coating is often applied to seeds so as to prevent dust-off of prior treatments that have been applied. For example, a film of biological material may be applied to the seed to increase the viability of the seed, and a protective coating is needed to prevent the film from being worn away from the seed during handling. The protective coating allows for a reduction in the amount of film treatment that needs to be applied, thus reducing costs to the seed company. The protective coating also increases the effectiveness of the film treatment by encapsulating the film on the seed. Also, the protective coating reduces environmental hazards of the film treatment.

Another purpose of providing a coating to seeds and small pharmaceutical products is to increase the size of the particle. Particularly for seeds which are too small to be mechanically planted, such an increase in size allows small seeds to be planted mechanically, rather than manually, thereby resulting in significant labor savings, both during the planting and by eliminating manual thinning. Mechanical planting also reduces the seed population required for planting, thereby providing further cost savings.

A third benefit provided by seed coatings is to increase the visibility of the seeds during planting. Therefore, more accurate and less wasteful planting results.

In prior art pelletizing operations, a binder material in a solution was applied by spray, and then a bulking agent, such as clay or wood fibers, was manually applied to the seeds. After the two-step binding and bulking operations were completed, the coated seeds were then taken to an oven to bake dry. Thus, the prior art multiple-step process was slow, time consuming, and labor intensive.

In the food industry, snack foods and cereals are often coated with seasoning, such as sugar or salt, to add flavoring. Such seasoning is normally applied as a solution, with the coated product then being dried. However, too much solution or slow drying can result in a saturated or soggy underlying food product, which is undesirable.

Therefore, a primary objective of the present invention is the provision of an improved method and means for coating particulate material, such as seeds, pharmaceuticals and food products.

A further objective of the present invention is the provision of a method and means for coating object using a plurality of spray nozzles and powder applicators in a rotating drum.

Another objective of the present invention is the provision of a method and means for coating particulate material, wherein the coating solution includes both a liquid and a powder, and is applied and dried in a rotating drum.

A further objective of the present invention is the provision of a method and means for coating particulate material wherein multiple layers of coatings can be applied in a continuous or batch process.

Still another objective of the present invention is the provision of a method and means for coating particulate material in a rotating drum having high airflow through the drum so as to maintain low drying temperatures.

A further objective of the present invention is the provision of a method and means for coating particles wherein a binder and a bulking agent are applied simultaneously in a solution, and a powder is used to hasten the coating build up and to hasten drying of the solution.

Yet another objective of the present invention is the provision of a method and means for coating particulate material in a rotating drum which is maintained at a negative pressure.

A further objective of the present invention is the provision of a means for coating particulate material which is economical to manufacture, and efficient and durable in use.

These and other objectives will become apparent from the following description of the invention.

SUMMARY OF THE INVENTION

A method and means is provided for coating particulate material. In a first embodiment using a continuous coating operation, the apparatus includes an elongated cylindrical perforated drum having an upper inlet end and a lower outlet end for flow through of the particulate material. In a second embodiment using a batch coating operation, the perforated drum has one open end for loading and unloading particulate material. In both the continuous and batch operations, the drum is mounted on a frame within a housing, with the angle of tilt of the drum being adjustable. The drum is operatively connected to a motor for rotating the drum about the tilted axis. A bar having a plurality of spray nozzles and a plurality of pneumatic powder pumps mounted thereon extends into the drum. A liquid coating solution is sprayed from the nozzles as the drum rotates, thereby coating the particulate material. With multiple nozzles, one or more liquid coating solutions may be sprayed from the nozzles so as to coat the particulate material as the drum rotates. The powder pumps dispense powder from a powder feed tube onto the material as the drum rotates. The pumps are individually regulated so as to produce a uniform powder coating throughout the length of the drum. The powder is applied to the particulate material while the solution is being sprayed. The powder permits a quicker build-up of coating layers, and quicker drying of the solution, since the powder absorbs the liquid solution. Heated air is supplied to the drum so as to dry the coating layers onto the material substantially instantaneously. Electrical circuitry and a computer or microprocessor are provided for controlling the operation of the apparatus.

In the continuous coating operation, as the material is tumbled in the rotating drum and coated with the liquid solution and powder, it increases in size and weight. Since the drum is tilted, the material flows by gravity downwardly through the drum for eventual discharge through the outlet end. As the material progresses through the drum, it is coated with solution from the successive spray nozzles and with the powder from the successive pumps.

In the batch operation, as the material is coated with the liquid and powder, it increases in size and weight. Since the drum is tilted, the material accumulates adjacent the end wall and along the sidewall of the drum. As the drum rotates in a clockwise position, the material is tumbled in the six o'clock-nine o'clock region of the drum and coated with solution from the spray nozzles and powder from the pumps. Initially, the material forms a dense mass, and as the material is sprayed and increases in size, the larger particles migrate away from the end wall and cannot penetrate the mass of smaller particles adjacent the end wall. Eventually, substantially all of the material is uniformly coated, such that the material forms a new mass wherein the particles are slightly larger than the original mass formed by the uncoated particles. The process repeats itself, such that the particles are coated with additional solution from the spray nozzles and with the powder from the pumps, thereby again increasing in size and weight and migrating away from the end wall. This cycle continues until the particles achieve a desired uniform size.

DETAILED DESCRIPTION OF THE DRAWINGS

Figure 1:
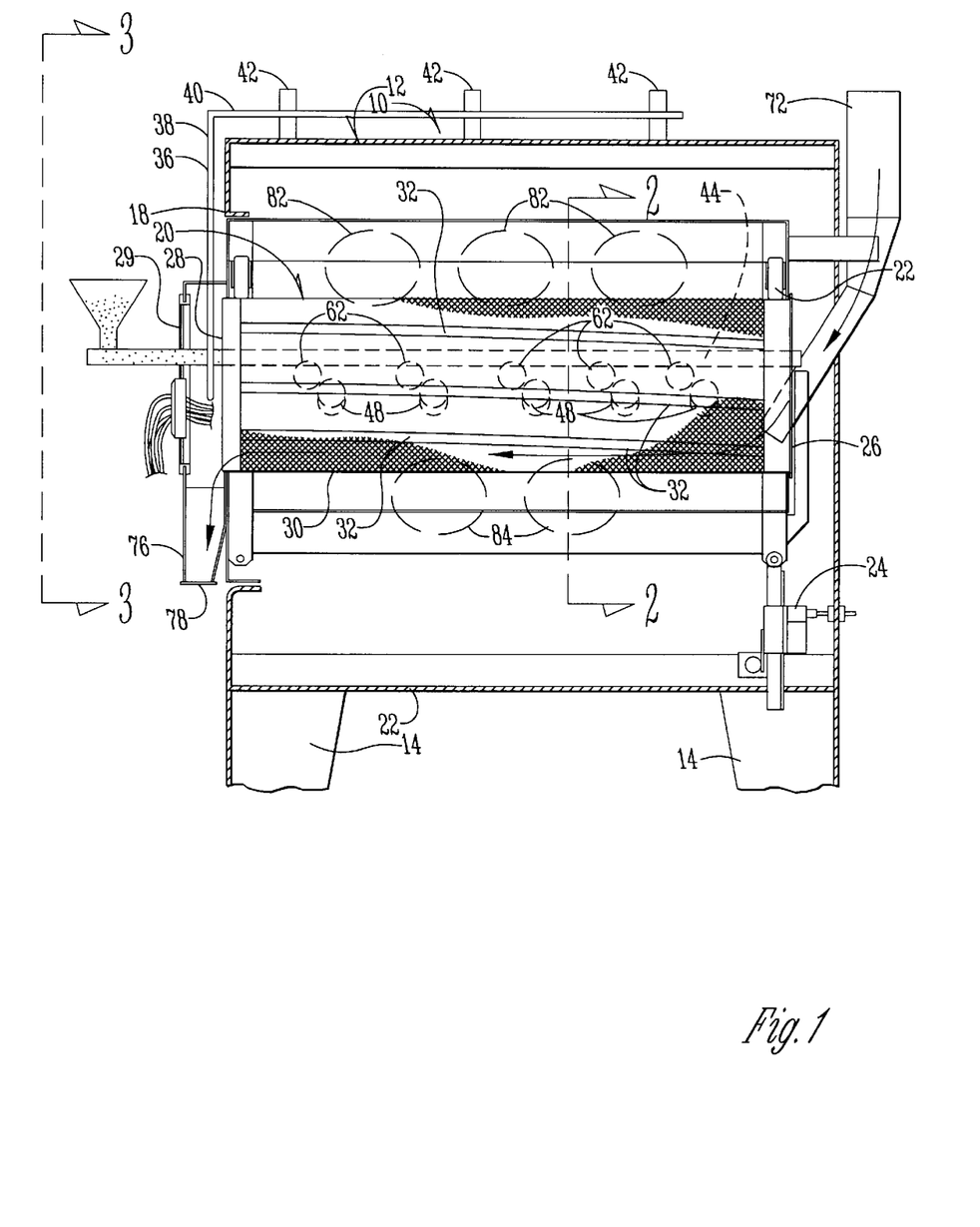
FIG. 1 is a sectional view of a continuous coating apparatus for particulate material having the powder application system of the present invention.
Figure 2:
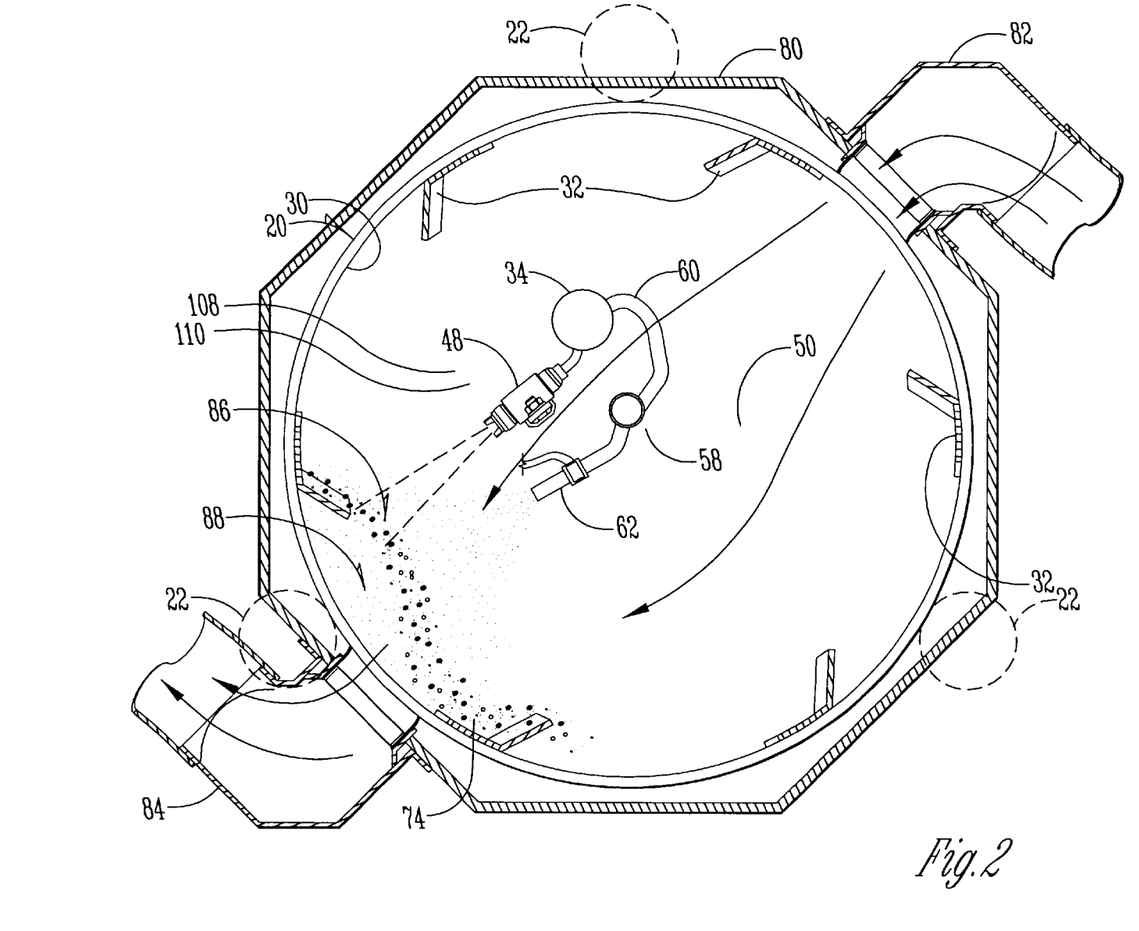
FIG. 2 is a sectional view taken along lines 2—2 of FIG. 1.
Figure 3:
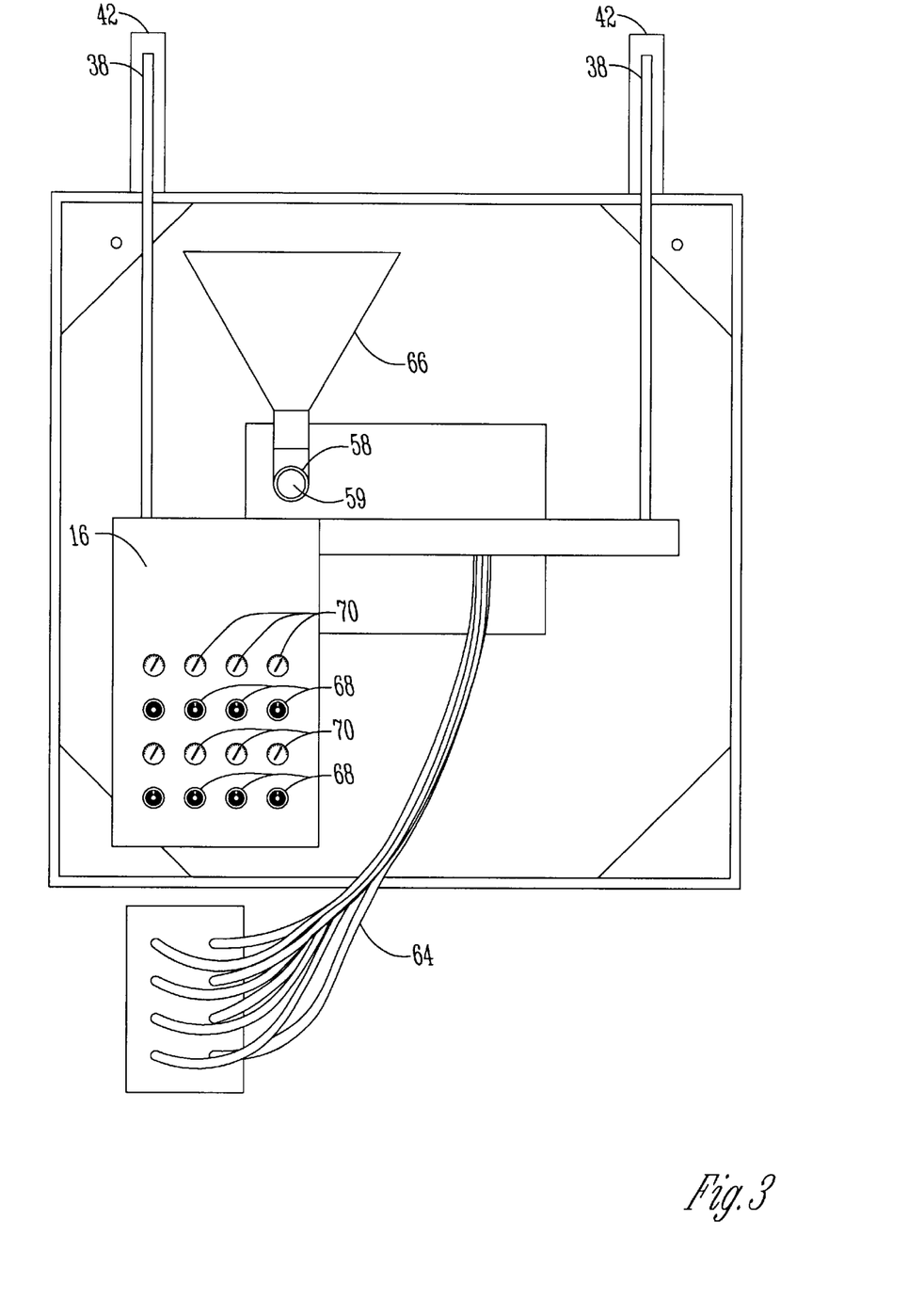
FIG. 3 is an end view taken along lines 3—3 of FIG. 1.

The continuous coating machine shown in FIGS. 1–3 is generally designated in the drawings by the reference numeral 10. The machine 10 includes a housing 12 with legs 14 to support the machine on a floor or other support surface. An instrument panel 16 is provided on the front wall 18 of the machine 10, as best seen in FIG. 3, and is operatively connected to electrical circuitry and a computer or microprocessor (not shown) for controlling the operation of the machine 10, as described below.

An elongated cylindrical drum 20 is rotatably mounted within the housing 12. The drum 20 is rotatably supported by a plurality of trunnion wheels 22 for rotation about its longitudinal axis by a chain or belt drive (not shown). At least one of the trunnion wheels is a drive wheel operatively connected to a motor (not shown) for rotating the drum 20. Preferably, the axis of the drum is inclined relative to a horizontal plane, between 0.5° and 6°. The tilt of the drum can be adjusted by a jack 24. The drum 20 has an inlet end 26 and an outlet end 28. A door 29 is provided for closing the outlet end 28 of the drum 20.

As seen in FIGS. 1 and 2, the drum 20 includes a perforated sidewall 30, which is preferably made from a mesh screen. A plurality of flightings 32 are provided on the interior of the sidewall 30, and may be part of a removable rifling. Preferably, the flightings 32 are not axially aligned with the axis of the drum 20, but rather are pitched slightly from one end to the other. Alternatively, the flightings may be axially aligned with the axis of the drum 20.

A spray boom or bar 34 is slidably extendable into and out of the drum 20. The spray boom 34 is cantilevered from a frame 36 having a pair of legs 38 extending upwardly outside of the housing 12 and a pair of arms 40. The arms 40 are slidably supported and guided by collars 42 on the top of the housing 12. Accordingly, the spray boom 34 can be extended into or retracted from the interior of the drum 20. When the spray bar 34 is inserted into the drum 20, the remote end 44 of the boom 34 is supported at the rear end 26 of the drum 20 in any convenient manner.

Figure 5:
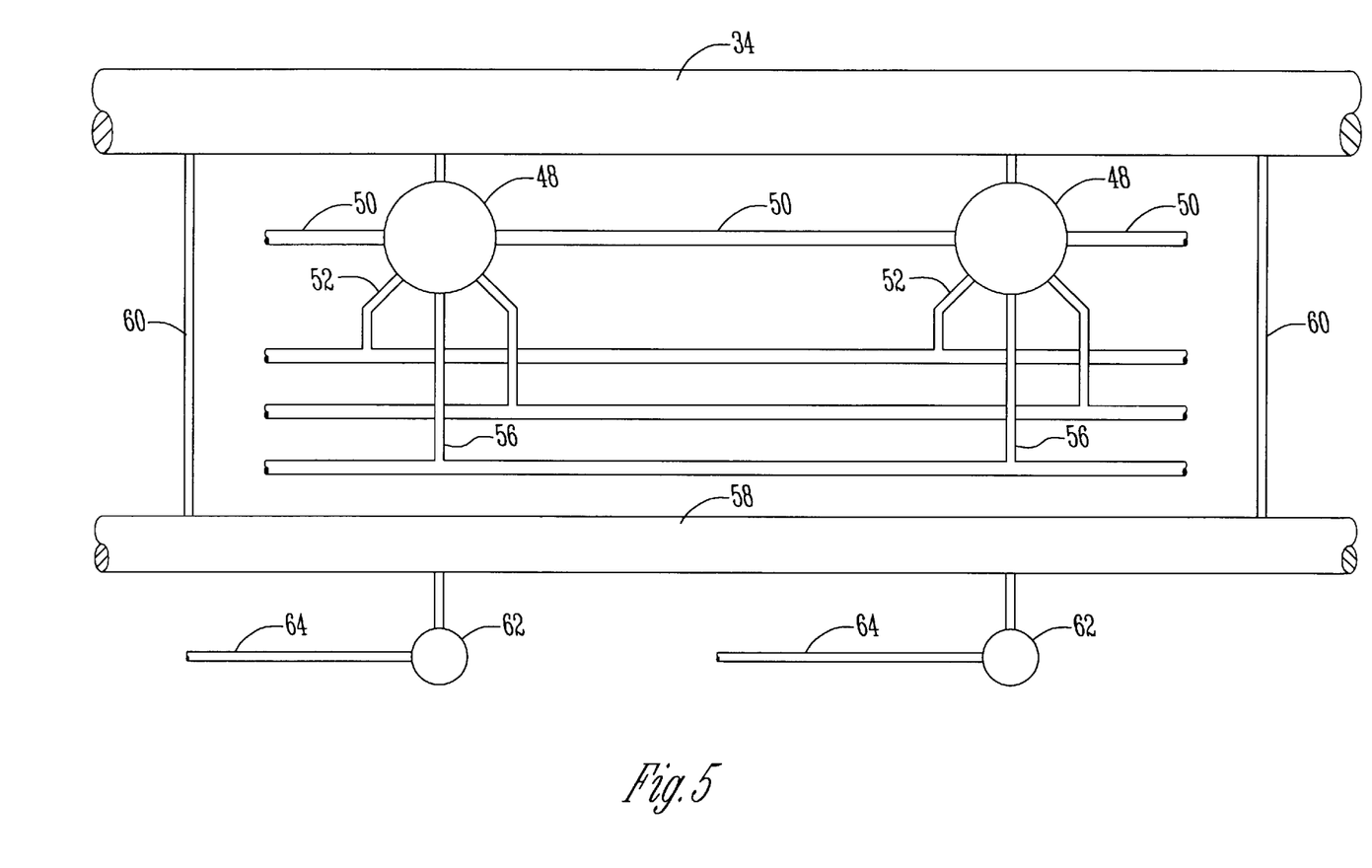
FIG. 5 is an enlarged schematic view of the support boom with the spray nozzles and powder pumps mounted thereon.

In the continuous coating machine 10, a plurality of solution spray nozzles 48 are spaced along the boom 34. The nozzles 48 are interconnected by a series of tubes or hoses, including a solution supply line 50, an atomization line 52, a solution drain line 54, and an air hose 56, as seen in FIG. 5. The spray nozzles 48 operate in a conventional manner to spray a solution onto particulate material passing through the drum 20.

Figure 4:
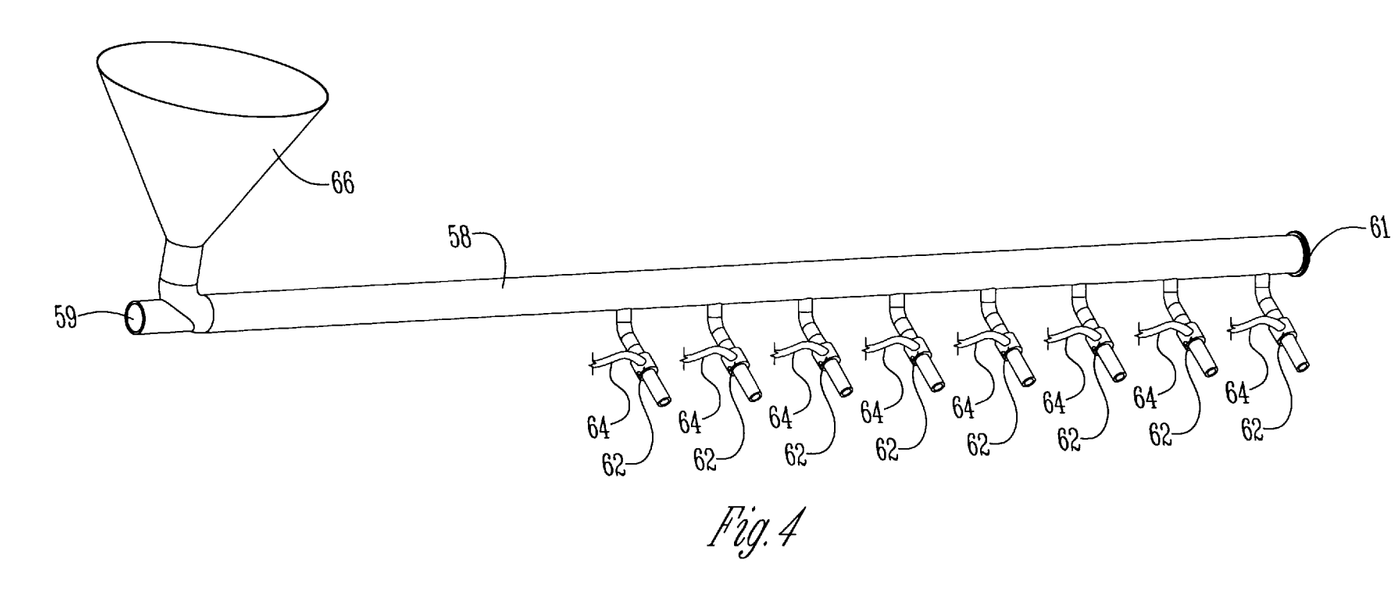
FIG. 4 is a perspective view of the powder funnel, tube and applicators of the present invention in a continuous coating drum.

The continuous coating machine 10 includes a powder supply tube 58 supported by the boom 34 via support brackets 60. A plurality of powder applicators 62 are spaced along the powder tube 58 to receive powder from the tube 58 and dispense powder onto the particular material in the drum 20. Preferably, the powder applicators are pneumatic vacuum pumps. A separate air hose 64 is provided for each of the pumps 62. A funnel or hopper 66 mounted on the boom 34 supplies powder to the powder tube 58, which has an open end 59 beneath the funnel 66 and a closed opposite end 61. The air hoses 64 are operatively connected to the instrument panel 16 so that the pumps 62 can be individually regulated via control knobs 68 and pressure gauges 70.

One example of an acceptable powder applicator 62 is a vacuum pump manufactured by Vaccon Vacuum Products. Each of the vacuum pumps 62 are connected to one of the compressed air hoses 64 that are individually pressure regulated. Regulating the pressure varies the velocity and the pressure differential through the venturies of the pumps 62. The low pressure created by the venturies creates a vacuum in the powder tube 58. By regulating the pressure of each vacuum pump 62, the powder flow through the tube 58 is equalized. Due to the hollow end of the powder tube 58, the negative pressure created by the pumps 62 draw powder through the length of the tube 58. Powder does not escape through the open end of the tube 58, since the pressure is higher at the open end than at any other point along the tube 58.

As seen in FIG. 1, the continuous coating machine 10 includes an inlet 72 for introducing particulate material 74 into the drum 20. A discharge chute 76 is provided at the opposite end of the drum 20. A door 78 is pivotally mounted on the discharge chute 76, and is pivotably moveable between a normally closed position and an open position. The door 78 may be counter-balanced and biased to the closed position. When a sufficient quantity of coated particulate material 74 enters the discharge chute 76, the weight of the material offsets the counter-balance door weight such that the door 78 pivots to the open position to allow the coated particulate material to be discharged from the chute 76.

The machine 10 includes a drying system for drying the material 74 in the drum 20, as the material is coated with the coating solution and powder. More particularly, as best seen in FIG. 2, the drying system includes a shroud 80 extending around the drum 20. An air inlet plenum 82 is operatively connected to a source of air, including a blower (not shown) and a heater (not shown), and extends through a portion of the shroud 80 for introducing heated air into the drum 20 through the perforated sidewall 30. An air outlet plenum 84 extends through the shroud 80 opposite the inlet plenum 82, and is operatively connected to a blower (not shown) for exhausting air from the drum 20. When the blowers for the inlet and outlet plenums 82, 84 are actuated, a negative pressure is maintained within the drum 20.

In the operation of the continuous coating machine 10, the particulate material 74 is introduced into the upper end 26 of the drum through the inlet chute 72. As the drum 20 rotates, the material 74 flows by gravity longitudinally through the drum for coating by the solutions sprayed from the nozzles 48 and powder dispensed from the pumps 62. The materials 74 may be coated with one or more solutions from the sequential nozzles 48. The powder absorbs the sprayed solution and thus hastens the build up of coating layers on the particulate material and facilitates drying of the liquid solution. Preferably, a negative pressure is maintained in the drum 20 during the coating process. However, there may be processes with no air flow, such as with a solid, non-perforated drum. The door 78 on the discharge chute 76 and the main door 29 of the machine 10 provide a seal at the outlet end 28 of the drum 20, while the incoming particulate material substantially seals the inlet end 26 of the drum 20. If desired, a pivotal flap door similar to the door 78 may be provided on the inlet chute 72 so as to enhance the seal at the inlet end 26 of the drum 20.

The drum is rotated at approximately 8–35 rpm, depending on the desired flow rate of the particulate material. As the drum 20 rotates, the flightings 32 carry the particulate material upwardly from approximately 6 o'clock position to a 9 o'clock position, as illustrated in FIG. 2. At approximately the 9 o'clock position, the material falls off of the flightings 32 so as to form a curtain 86 of material spaced apart from the sidewall 30 of the drum 20. The nozzles 48 and pumps 62 are directed toward the curtain of material 86. Air, preferably heated, from the inlet plenum 82 is drawn through the curtain 86 of material and the space 88 between the curtain and the sidewall 30 of the drum 20 and exhausted through the perforated sidewall of the drum via the outlet plenum 84. The air substantially instantaneously dries the coating solution onto the particulate material. As the material 74 progresses along the length of the drum 20, the material is coated with successive layers of solution and powder so as to increase in size and weight. As the material reaches the outlet end 28 of the drum 20, the material 74 accumulates in the discharge chute 76 until a sufficient quantity of material pivots the door 78 to the open position for discharge of the coated material. The material 74 is preferably in the drum 20 for 1.5 to 10 minutes during the coating process, though more or less time may be necessary for certain coating processes.

Preferably, a computer or micro-processor is employed for controlling the operation of the machine 10. For example, the computer may be utilized for controlling the electrical power to the apparatus, the tilting angle and rotation of the drum 20, the spraying function of the nozzles 48 and pumps 62, and the air flow and temperature in the drying system. The computer is operatively connected to the instrument panel 16, which has the appropriate electrical circuitry, control buttons and indicator lights, so that a person can start and stop the various functions of the machine 10, and monitor its operation.

Figure 6:
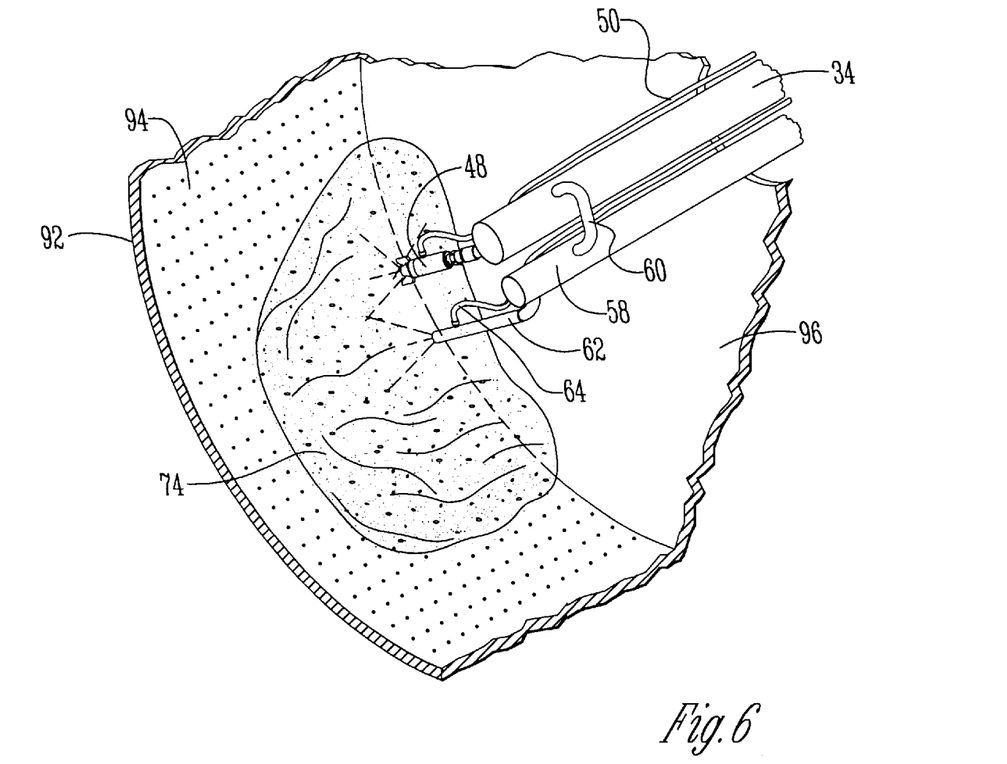
FIG. 6 is a partial sectional view of a drum for a uniform batch coating machine according to the present invention.

In an alternative embodiment, the improved powder applicator of the present invention can also be utilized in a batch coating machine, as shown in FIG. 6. The batch coating machine includes a rotatable drum 92 with a perforated sidewall 94, a back wall 96, and a front opening with a door (not shown). The drum 92 is supported for rotation and adjustable tilting through structure that is known in the art. In the batch machine, the boom 34 extends through an opening 98 in the back wall 96 or through an opening in the door to support at least one spray nozzle 48 and at least one powder applicator 62 within the drum 92.

The uniform batch coating machine of FIG. 6 includes an instrument panel, electrical circuitry, and a computer or micro-processor for controlling the operation of the machine, similar to that described above for the continuous coating machine 10. The batch machine also includes a drying system, including a shroud, air inlet and outlet plenums, similar to that described above for the continuous coating machine 10.

In the operation of the batch coating machine, the front door (not shown), is opened and a quantity of particulate material 74 is manually loaded into the drum 92 through the door opening. The door is then closed and the drum 92 is mechanically or hydraulically tilted to the desired degree of elevation between 0–18° above a horizontal line or plane. With such tilting of the drum, the material 74 tend to accumulate against the back wall 96 and side wall 94 of the drum 92, as seen in FIG. 6. A motor is then actuated so as to rotate the drum 92 and its axis at approximately 32–40 rpm.

Rotation of the drum in a clockwise direction causes the particulate material 74 to tumble within the drum 92, generally between the six o'clock and nine o'clock positions, as seen in FIG. 6. The spray nozzle 48 is then actuated so as to supply a spray of coating solution onto the particulate material 74. The solution preferably includes both a binder and a bulking agent, such that the coated materials increase in size and weight. The spray from the nozzle 48 is directed rearwardly towards the back end wall 96 so as to coat a portion of the seeds contained within the drum.

Simultaneously with actuation of the spray nozzle 48, the powder pump 62 is actuated so as to supply powder through the pipe 58 for discharge onto the particulate material 74. The powder absorbs the sprayed solution so as to hasten build up and drying of the coating layers on the particulate material.

Initially, the particulate material 74 forms a dense mass. As the particulates become coated with the solution from the spray nozzle 48 and the powder from the application 62, the increased size of the coated particulates causes those enlarged particulates to migrate away from the end wall 96, due to the centrifugal force of the rotating drum 92. Such enlarged particulates also will not reenter or penetrate the dense mass of smaller uncoated particulates. Thus, eventually, all of the particulate material is coated to a substantially uniform size by the spray solution and powder, which is directed at the mass. The particulates then form a new dense mass and the process is repeated. This cycle continues until the particulates are coated to a desired size. With this process, the particulate material is coated to a uniform size as the particulates migrate in and out of the path of the spray and powder.

As the particulate material is coated with the sprayed solution and powder, the drying system is actuated so that the solution is substantially instantaneously dried on the particles. More particularly, air is forced through the apertures of the sidewall 94 of the drum 92 to dry the particles. For example, the air may be introduced at a temperature of approximately 150° F. and exhausted from the drum at an approximate temperature of 90° F. The material maintains a substantially constant temperature of 83° F. thereby avoiding any deterioration or damage to the particulates or to biological ingredients in the coating solution. Also, actuation of the drying system creates a negative pressure within the drum. After the particulates have reached the desired uniform size, a vacuum system is actuated to remove the material from the drum without manual handling.

Depending on the particulate material being coated, different powders may be utilized, including clay, a dry biological composition (such as rhizobium), a food flavoring or seasoning, or other substances.

Whereas the invention has been shown and described in connection with the preferred embodiments thereof, it will be understood that many modifications, substitutions, and additions may be made which are within the intended broad scope of the following claims. From the foregoing, it can be seen that the present invention accomplishes at least all of the stated objections.

What is claimed is:

1. A machine for coating particulate material, comprising: a rotatable drum;

at least one spray nozzle in the drum for spraying a solution onto particulate material in the drum;

at least one powder pump in the drum for depositing powder onto the particulate material in the drum.

2. The machine of claim 1 wherein the pump is a vacuum pump.

3. The machine of claim 1 wherein the pump is pneumatically operated.

4. The machine of claim 3 further comprising an air line operatively connected to the pump.

5. The machine of claim 1 further comprising a plurality of powder pumps each being separately regulated to control the volume of powder dispensed therefrom.

6. The machine of claim 1 further comprising a control system for regulating the powder pump.

7. The machine of claim 1 wherein the spray nozzle and powder pump operate simultaneously.

8. The machine of claim 1 further comprising a powder feed tube extending into the drum to supply powder to the powder pump.

9. The machine of claim 1 wherein the feed tube is operated under a vacuum condition.

10. The machine of claim 1 wherein the nozzle and pump are mounted on a boom removably extendable into the drum.

11. A machine for coating particulate material, comprising:

a rotatable drum;

a boom extending into the drum;

a plurality of spray nozzles mounted on the boom;

a plurality of powder applicators mounted on the boom;

a solution tube for supplying solutions to the nozzles;

a powder tube for supplying powder to the applicators;

a plurality of air hoses, each being connected to one of the powder applicators; and a control system for individually operating each of the applicators.

12. The machine of claim 11 wherein the nozzles, applicators and air source operated simultaneously.

13. The machine of claim 11 wherein the applicators are pneumatic.

14. The machine of claim 11 wherein each of the applicators include a venturi.

15. The machine of claim 11 further comprising an air source to move air through the drum to dry the product therein.

* * * * *